United States Patent
Ortiz et al.

(10) Patent No.: US 6,631,063 B2
(45) Date of Patent: Oct. 7, 2003

(54) SYSTEM FOR MONITORING ELECTRICAL CIRCUIT OPERATION

(76) Inventors: Hector P. Ortiz, 8105 W. 20th Ave., Hialeah, FL (US) 33014; Jose Oliver, 8105 W. 20th Ave., Hialeah, FL (US) 33014

( * ) Notice: Subject to any disclaimer, the term of this patent is extended or adjusted under 35 U.S.C. 154(b) by 96 days.

(21) Appl. No.: 09/874,707

(22) Filed: Jun. 5, 2001

(65) Prior Publication Data

US 2002/0181178 A1 Dec. 5, 2002

(51) Int. Cl.$^7$ ............................................. H02H 3/18
(52) U.S. Cl. ................................................... 361/79
(58) Field of Search ........................... 361/78, 79, 83, 361/86, 87, 88, 93, 94

(56) References Cited

U.S. PATENT DOCUMENTS

| | | | | |
|---|---|---|---|---|
| 5,295,036 A | * | 3/1994 | Yagi et al. | 361/79 |
| 5,412,528 A | * | 5/1995 | Mader et al. | 361/62 |
| 5,572,396 A | * | 11/1996 | Robinson | 361/117 |
| 5,609,595 A | * | 3/1997 | Pennig | 606/73 |
| 5,828,177 A | * | 10/1998 | Toda et al. | 315/127 |
| 6,078,489 A | * | 6/2000 | Messerli et al. | 361/87 |

* cited by examiner

*Primary Examiner*—Adolf D. Berhane
(74) *Attorney, Agent, or Firm*—McHale & Slavin, P.A.

(57) ABSTRACT

A system for supplementing existing safety devices in light circuits by real-time monitoring of current and voltage levels in light circuits to diagnose and pinpoint problems in the circuit, and to activate a safety disconnect in the event hazardous conditions are detected. The system includes a monitor device electrically coupled to a light circuit service panel. The monitor device includes a switching means complementary to an existing disconnect means operable to independently disconnect a light circuit from a power source, and input means for collecting real-time data from a plurality of circuits. The input means includes a means for detecting unequal current levels in the light circuits, a means for continuous surveillance of ground wire continuity for each light circuit, and means for continuous sensing of the current and voltage levels in each light circuit. A processor coupled to the input means is operable to perform the steps of analyzing the current and voltage levels in each light circuit in real time by comparing the data with known parameters. The system can include a plurality of ground wire test circuits for continuous surveillance of ground wire continuity. A communication means coupled to the processor allows data to be transmitted to a remotely located external processor.

23 Claims, 8 Drawing Sheets

SYSTEM FOR MONITORING ELECTRICAL CIRCUIT OPERATION

FIELD OF THE INVENTION

This invention relates generally to the field of electrical circuits, and more specifically to a system which supplements existing safety devices by real-time monitoring of current and voltage levels in light circuits to actuate a safety disconnect.

BACKGROUND OF THE INVENTION

Electrocution deaths due to failures in large-scale lighting systems are an increasing public safety concern. Even if a lighting system was properly designed, an aging electrical infrastructure, unplanned wiring degradation due to saltwater intrusion, hurricane, tornados, flooding, storm damage, or human intervention (e.g. car accidents) can cause a lighting circuit to become dangerous for any person who comes in contact with the damaged circuit. This leaves the service man, as well as the private individual, in a potentially dangerous situation. For example, in the year 2000 alone three people were electrocuted in the Miami area due to accidental contact with a malfunctioning electrical circuit.

There are existing safety systems in place designed to prevent these accidents, however, such systems are not capable of addressing the unplanned circuit interrupts. In the case of street lights, for example, circuit breakers are present inside the poles themselves, and a main breaker for a street light circuit is typically located in the main service panel for the circuit. Unfortunately, not every electrical malfunction will trigger the circuit breakers. A ruptured wire in a pole may be located past a breaker in the wires, and as a result the breaker will not be tripped. A "silent" short circuit may be present, which creates hazardous conditions without being strong enough to enact a safety disconnect.

The most crucial factor in preventing executions is the proper grounding of each light pole. The circuit breakers only trip if the pole is grounded. With proper grounding, the pole has no electrical potential above ground. A serious problem exists that ground can be lost, and the street lighting system continues to appear to function normally because there is no ground to trip the circuit breaker. In this situation, a deadly ground fault can exist undetected in the system.

Most electrical malfunctions resulting in electrocution hazards are caused by faulty wiring, which may be ruptured or frayed, or by the installation of improperly-sized components. Since the lights may continue to function normally under these conditions, the problem may not be detected until a malfunction occurs. A common practice in street light maintenance is that poles and lines are only serviced when a light goes out or some other visible problem occurs. For reasons of public safety, it would be highly beneficial to perform an on-going diagnostic check of light circuits instead of waiting for a malfunction to take place.

There remains a great need to provide a system which can provide an added layer of safety to an existing light system. It would be obviously advantageous to detect and identify ground faults and short circuits in real time and immediately disconnect the problem light circuit. It would also be advantageous to continuously monitor the continuity of the grounding conductor of a circuit, and provide an immediate disconnect if ground is lost. These safeguards are not provided by existing safety devices.

In view of the above, it would be highly desirable to provide a computer-implemented safety system which continuously monitors the current and voltage in each circuit, as well as providing a means to continuously monitors the integrity of the grounding conductor. By monitoring the current and voltage and comparing the data with known algorithms as demonstrated in the present invention, it is also possible to detect and pinpoint problems in the circuits. The system for a light circuit safety disconnect as described herein is not shown or demonstrated in the prior art.

SUMMARY OF THE INVENTION

It is an objective of the invention to provide a safety system for light circuits which continuously monitors and analyzes the current and voltage in the circuit, and activates an emergency disconnect from the power source if hazardous conditions are detected.

It is a further objective of the invention to provide a safety system for light circuits which continuously monitors the continuity of the grounding conductor.

It is another objective of the invention to provide a safety system for light circuits which can detect short circuits which is not sufficient to blow a safety fuse.

It is still another objective of the invention to provide a safety system for light circuits which provides on-going diagnostic functions by monitoring the current and voltage in each circuit and comparing the voltage and current with known algorithms for a properly functioning light circuit.

It is yet another objective of the invention to provide a safety system for light circuits which monitors power consumption.

In accordance with the above-objectives, the present invention provides a system which supplements existing safety devices by real-time monitoring of current and voltage levels in light circuits to diagnose and pinpoint problems in the circuit, and to activate a safety disconnect in the event hazardous conditions are detected. The system includes a monitor device electrically coupled to a light circuit service panel. The monitor device includes aa switching means complementary to an existing disconnect means operable to independently disconnect a light circuit from a power source, and input means for collecting real-time data from a plurality of circuits. The input means includes a means for detecting unequal current levels in the light circuits, a means for continuous surveillance of ground wire continuity for each light circuit, and means for continuous sensing of the current and voltage levels in each light circuit. The means for sensing the current and voltage levels can be a measuring transducer. The monitor device includes a processor coupled to the input means which is operable to perform the steps of analyzing the current and voltage levels in each light circuit in real time by comparing the data with known parameters, computing power usage in each circuit and analyzing the power usage by comparison with known parameters, determining if disconnect conditions exist in each circuit; and disconnecting the circuit from a power source if hazardous conditions requiring an emergency disconnect are detected.

The means for continuous surveillance of ground wire continuity preferably comprises a plurality of ground wire test circuits corresponding to each of the plurality of light circuits, a test signal generator operable to transmit a known test signal through the ground wire test circuits, and a means for continuously sensing of the current level each of the ground wire test circuits. The processor is operable to perform the steps of analyzing said current level in each ground wire test circuit by comparing the current level with known parameters, determining if disconnect conditions exist for a light circuit, and disconnecting the light circuit from a power source if disconnect conditions exist. The disconnect conditions can be a ground fault detected by a decrease in the ground wire test circuit current level due to a discontinuity in the ground wire.

The processor is also operable to detect a short circuit or ground fault in a light circuit by comparing the current level and the voltage level with known parameters and disconnecting said light circuit if a short circuit or ground fault exists. The number of non-functional lamps on each circuit can be determined by comparing the current level and the voltage level with known parameters. The system can similarly detect non-functional components and also determine if proper size components are being used.

The system can further include a communication means coupled to the processor and a remotely located external processor, wherein the monitor device is in communication with the external processor. The monitor device transmits input data from the light circuits is transmitted to the external processor. The external processor can be in communication with a plurality of monitor devices. The communication means can be via a modem using telephonic communication methods, a radio transceiver system, or satellite communication system. The monitoring device can detect a power failure in a light circuit by comparing the current level and said voltage level with known parameters and transmitting an indication of the power failure via the communication means to the external processor or directly to the responsible utility company. The external processor can also be operable to analyze the current, voltage and power in each light circuit.

DETAILED DESCRIPTION OF THE INVENTION

The present invention provides a safety system for monitoring lighting systems and activating an emergency disconnect when hazardous conditions occur. While the embodiment of the invention as described herein references street lighting systems, the practice of the invention is not limited in this regard. The practice of the invention could be applied to any large scale outdoor lighting systems, such as traffic signals, and localized large area illumination systems.

Figure 1:
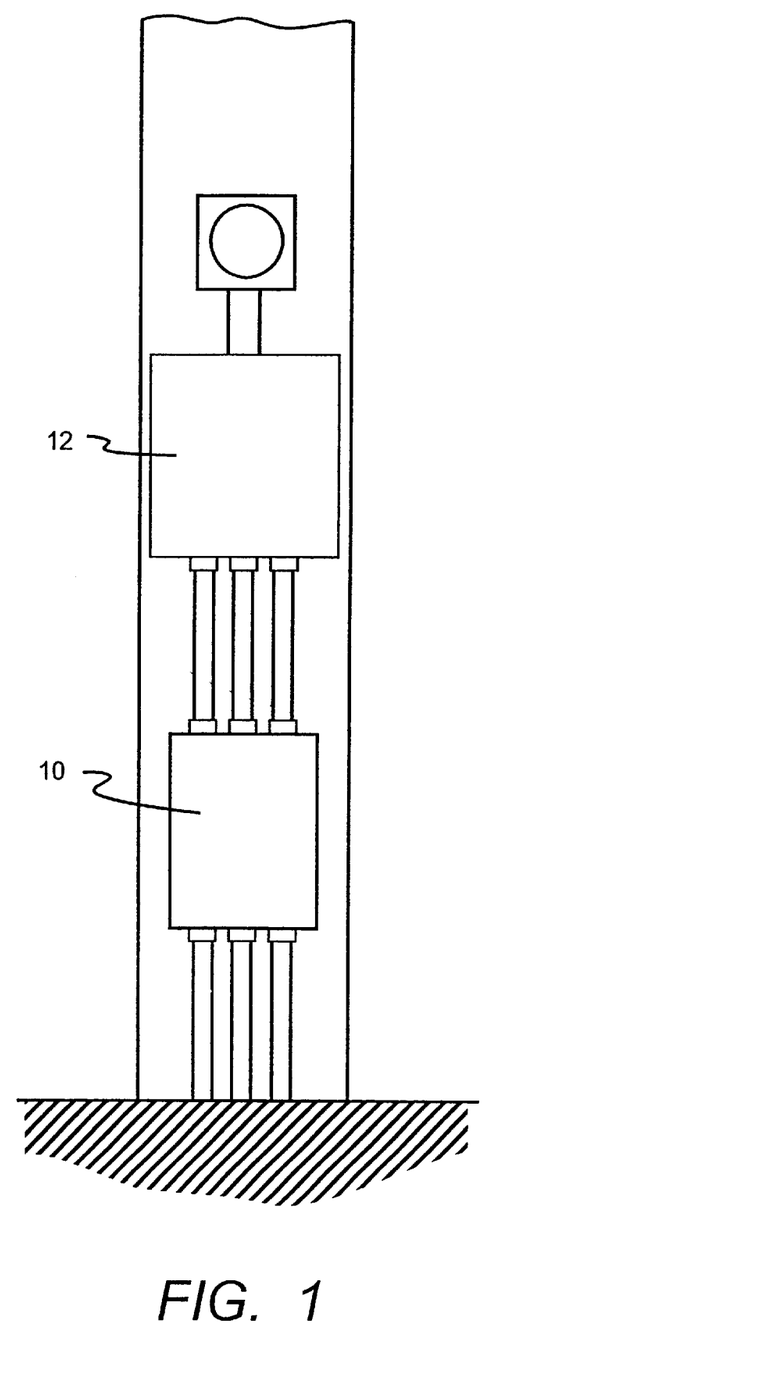
FIG. 1 illustrates the typical installation arrangement for a monitor device in relation to a street light service panel in accordance with a preferred embodiment of the invention.

The system of the invention complements the existing safety devices in a lighting system to detect hazardous conditions which would not be of the type to blow fuses or trip circuit breakers. For ease of explanation, a street light circuit will be detailed in the specification. The system includes a monitor device coupled to a plurality of street light circuits. The monitor is preferably installed in proximity to a service panel for the plurality of street light circuits. FIG. 1 illustrates the typical installation arrangement for a monitor device 10 in relation to a street light service panel 12.

Figure 2:
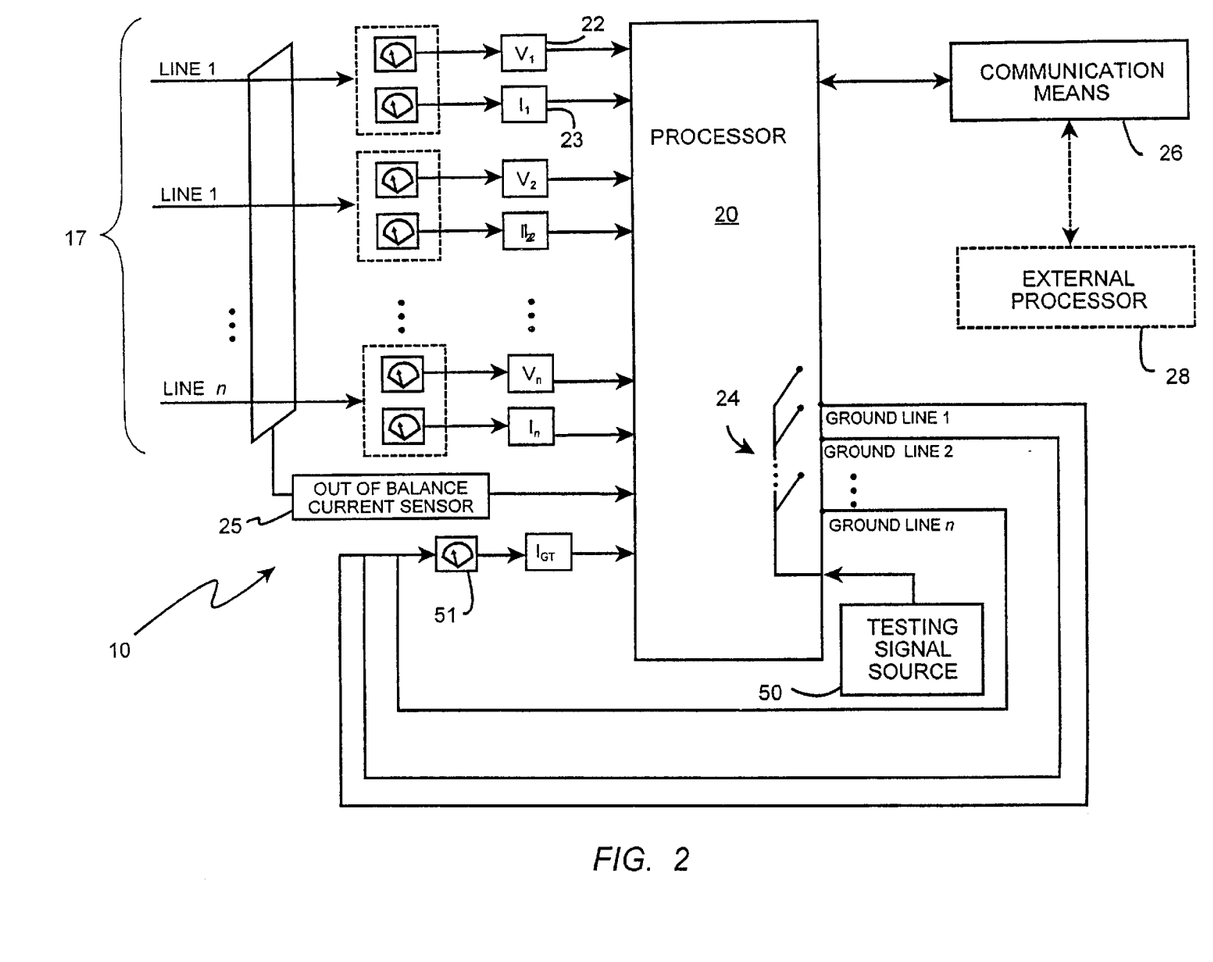
FIG. 2 schematically illustrates the function of the monitor device in accordance with a preferred embodiment of the invention.

The monitor device 10 is operable to continuously monitor current and voltage levels in each of the plurality of street light circuits. FIG. 2 schematically illustrates the function of the monitor device 10. The monitor device is electrically coupled to a plurality of street light circuits 17 represented as lines 1–n. The monitor includes a switching means (not shown) to independently disconnect a circuit from the power source. The monitor device 10 includes input means 11 to input data in real time derived from the operation of the street light circuits into the processor 20. In the preferred embodiment, the monitor device 10 preferably includes a communication means 26 by which data can be transmitted to an external processor 28 located remotely from the monitor device 10. The communication means 26 can be any suitable mode of electronic communication. The communication means 26 can be via a modem using telephonic communication methods, a radio transceiver system, or satellite communication system.

The monitor 10 preferably continuously senses the level of voltage and current in each of the street light circuits. In the preferred embodiment, the input means includes measuring transducers $22_{1-n}$ and $23_{1-n}$ which continuously detect and quantify the voltage levels $V_{1-n}$ and current levels $I_{1-n}$ respectively in each circuit. The input means also preferably includes out of balance current sensor 25 which simultaneously monitors the current levels in the lines 1–n to detect if current levels become unequal. If an out of balance current condition is detected, a signal is transmitted to the processor 20.

Figure 3:
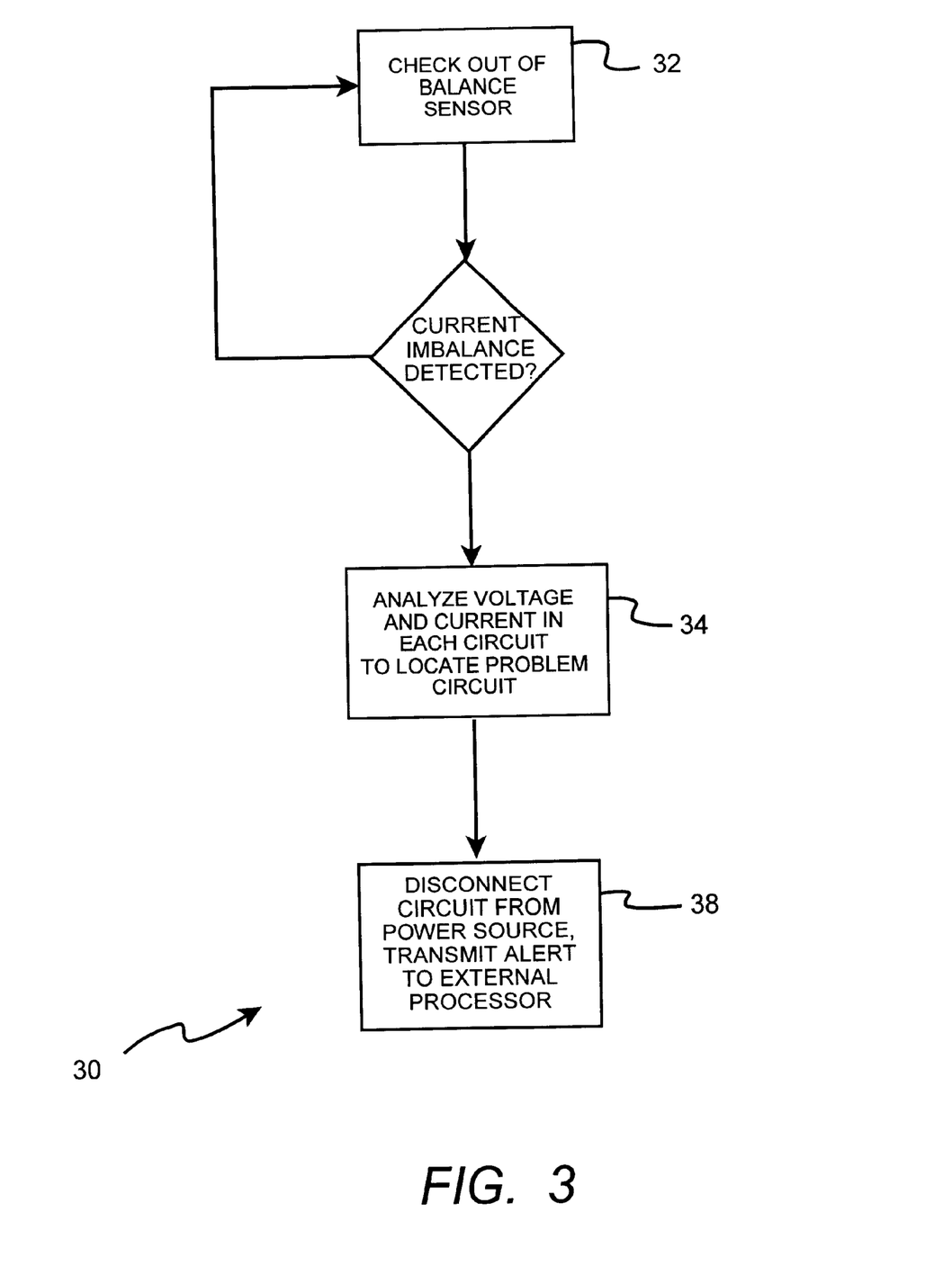
FIG. 3 illustrates the operative steps performed by the processor to monitor the out of balance current in accordance with the invention.

An out of balance current condition indicates a malfunction in at least one of the street light circuits. An out of balance current condition may be indicative of a dangerous short circuit or ground fault in a circuit. FIG. 3 illustrates the operative steps performed by the processor 20 to monitor the out of balance current. The monitor receives continuous input 32 from the out of balance sensor. If a current imbalance is detected 34, the voltage and current from each circuit is analyzed to locate the problem circuits. If a potentially dangerous condition such as a ground fault or short circuit is detected, the monitor disconnects the circuit from the power source and transmits an alert to the external processor (step 38).

Figure 4:
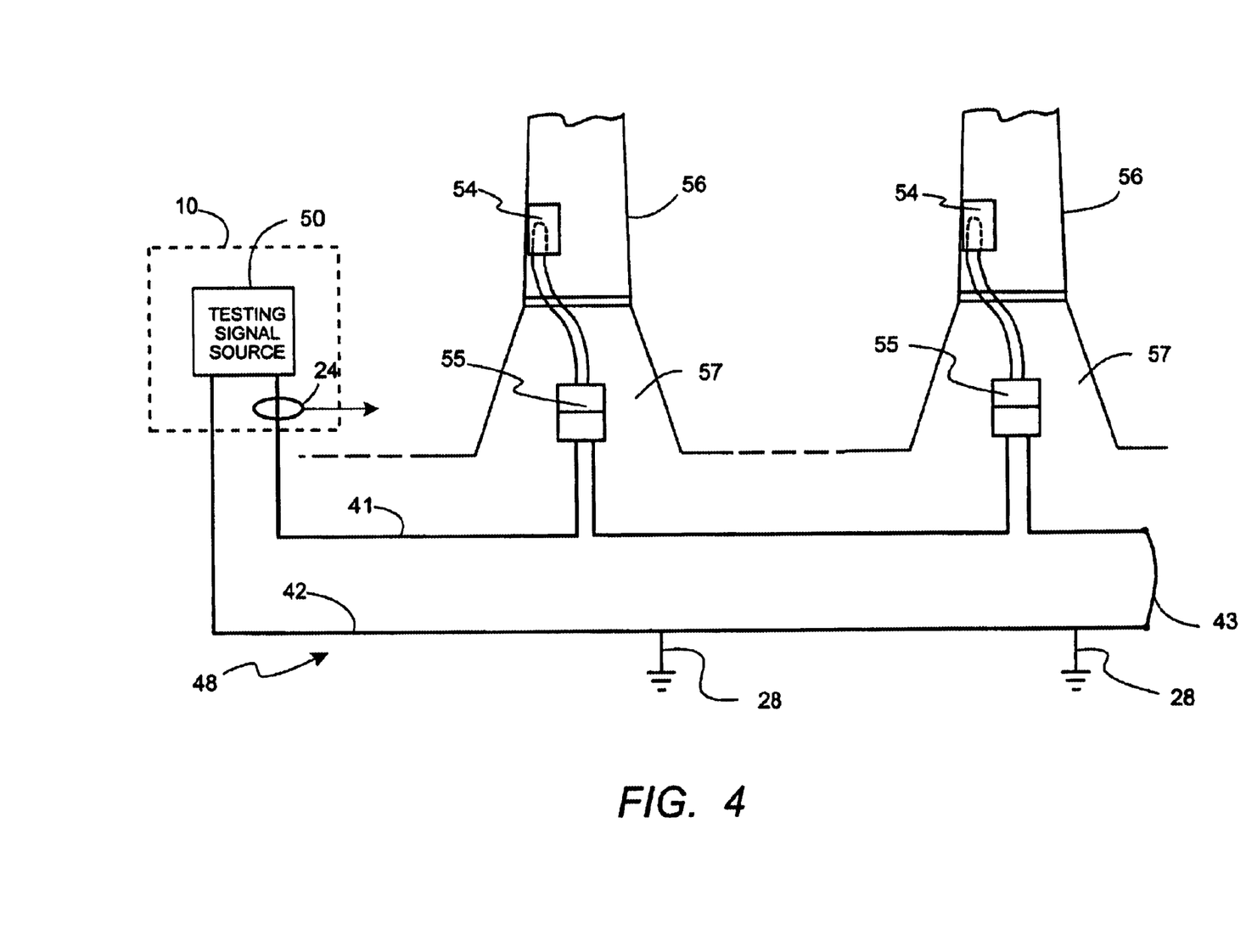
FIG. 4. illustrates a preferred arrangement for monitoring the continuity of the grounding wire for a street lighting circuit in accordance with the invention.

In the preferred embodiment of the present invention, the system includes a means to monitor the continuity of the grounding wire for each circuit. A preferred method of monitoring the grounding wire is shown in FIG. 4. As is the normal installation arrangement, the existing grounding wire 41 for a street light circuit is coupled to a plurality of lighting pole fixtures 46. The grounding wire 41 is coupled to a test signal source 50 (FIG. 1) integral to the monitor device 10. In the practice of the invention, an additional test wire 42 is employed along the length of grounding wire 41 which is coupled to grounding poles 28. Test wire 42 is also coupled to testing signal source 50. In the preferred embodiment, test wire 42 is 14 gauge wire, however, any suitable wire may be used. The terminal end of grounding wire 41 is electrically coupled to test wire 42 to form ground wire test circuit 48. In the illustrated embodiment, jumper 43 connects grounding wire 41 to test wire 42. The grounding wire 41 and the test wire 42 are operatively coupled to the terminals of testing signal source 50 to allow a known test signal to be transmitted is through the ground wire test circuit 48. The input means of monitoring device 10 further includes measuring transducer 51 which is coupled to the ground wire test circuit 48. The measuring transducer 51 senses the current $I_{GT}$ in the ground wire test circuit 48. A decrease or cessation of the current $I_{GT}$ is indicative of a loss of ground in the street light circuit. Accordingly, the processor 20 is operable to immediately disconnect the street light circuit from the power source if a fluctuation in the current $I_{GT}$ is detected.

As is the conventional practice, street lighting poles 56 are constructed with a frangible breakaway seam 57 at a location near the base of the street lighting pole 56. If the street lighting pole 56 is impacted with sufficient force to be knocked down, the break occurs at the breakaway seam 57 so as to disengage the disconnect plug 55, which results in a discontinuity of the ground wire 43. A situation in which the pole 56 is knocked down can thus result in a ground fault which would not be detected by existing safety mechanisms. Further, with a loss of ground, circuit breakers in the pole will not trip. The system of the present invention advantageously detects a loss of continuity in the ground wire and immediately disconnects the circuit from the power source.

Referring again to FIG. 2, it is seen that the monitor device 10 includes a sequential switching device 24 which is coupled to the testing signal source 50. The sequential switching device 24 is operable to electrically couple the testing signal source 50 to the ground lines 1–n in a repeating sequence. The processor 20 includes programming operable to rotate the sequential switching device 24 through connections with ground lines 1–n, thus forming test circuits 1–n in a set sequence. The test signal from testing signal source 50 is transmitted through test circuits 1–n in sequence. A current measuring transducer 51 detects the current $I_{GT}$ in the test circuits 1–n. The quantified value of $I_{GT}$ is input to the processor 20.

Figure 5:
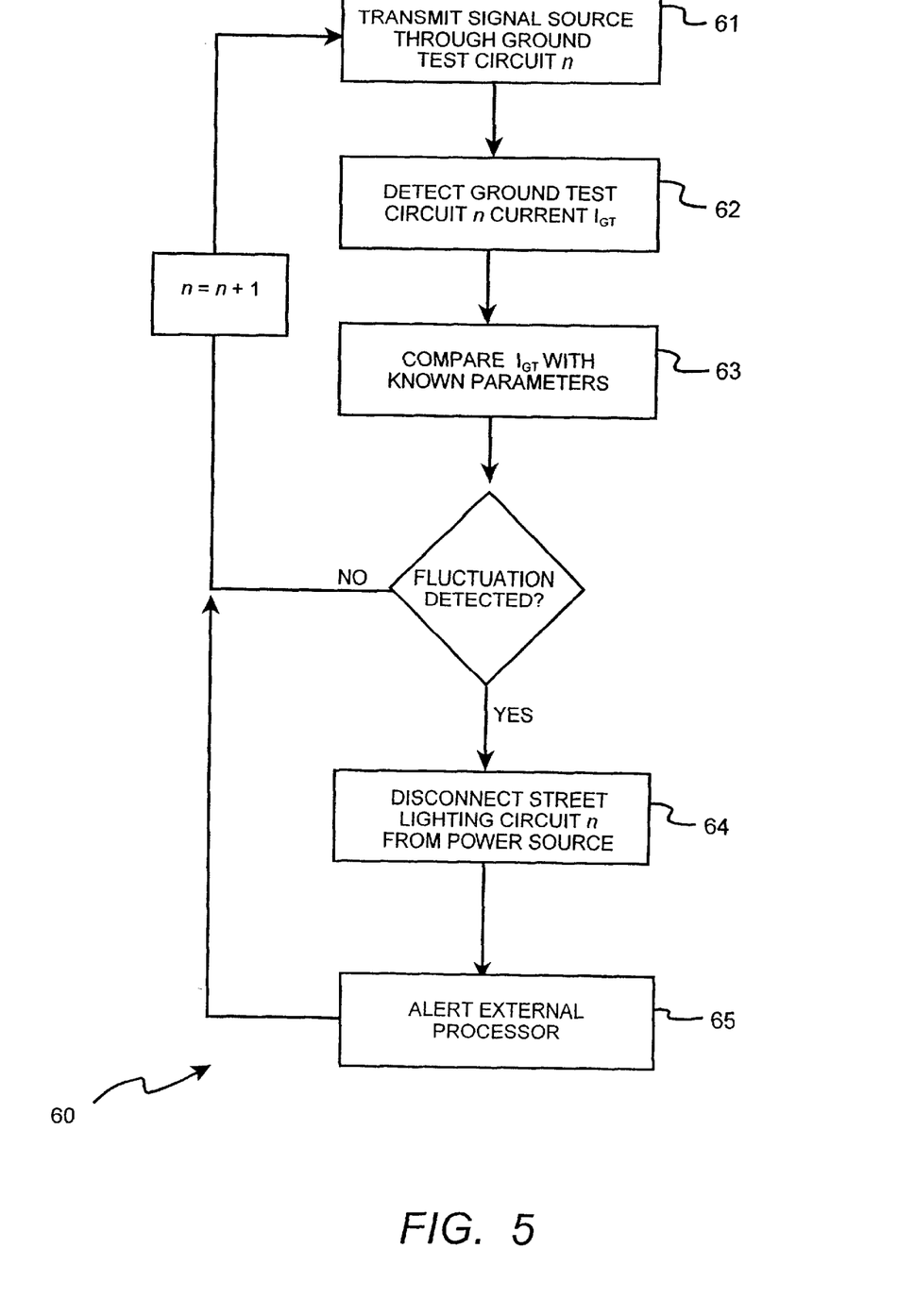
FIG. 5 illustrates steps performed by the processor to monitor ground wire continuity in a plurality of street lighting circuits in accordance with the invention.

FIG. 5 illustrates steps 60 performed by the processor 20 to monitor ground wire continuity in a plurality of street lighting circuits 10 1–n. In step 61, the sequential switch is actuated by the processor to form ground test circuit n and transmit a known test signal through the ground test circuit n. The ground test circuit current $I_{GT}$ is sensed 62 and compared with known parameters 63. If a fluctuation in the current $I_{GT}$ from known levels is detected, the street lighting circuit n is immediately disconnected from the power source 64, and the external processor is alerted 65. If the current $I_{GT}$ is within normal parameters, the next sequential switch forms ground test circuit n+1 to check the next street lighting circuit. In the preferred embodiment, the processor 20 continuously checks each street lighting.

Figure 6:
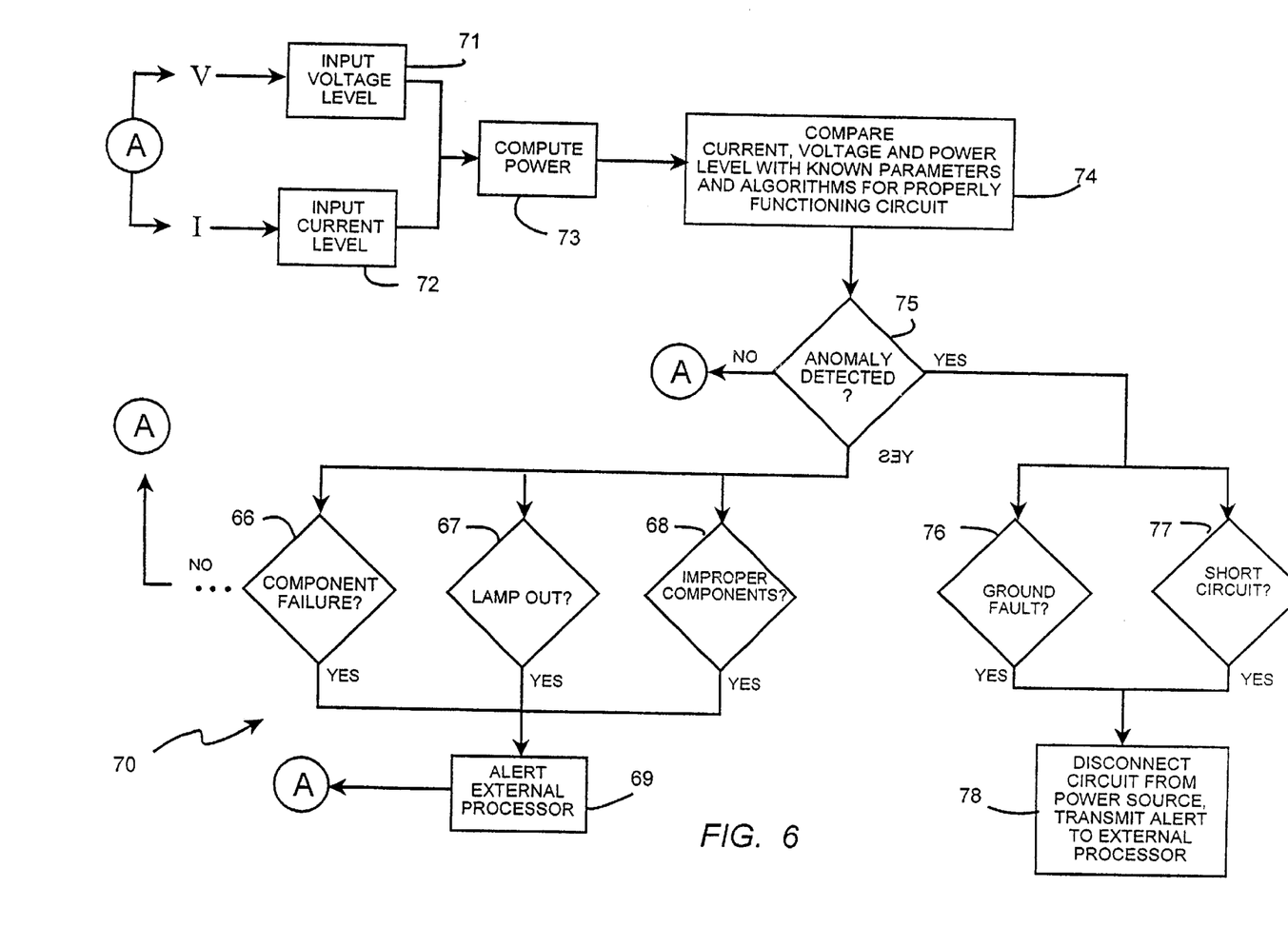
FIG. 6 illustrates steps performed by the processor to analyze the voltage and current levels in a street lighting circuit in accordance with the invention.

FIG. 6 illustrates steps 70 performed by the processor 20 to analyze the voltage and current levels in a street lighting circuit. The voltage and current levels are continuously monitored in real time, and quantified for input into the processor 20 (steps 71, 72). In the step 73, the power is calculated.

The processor then compares the current, voltage, and power levels with known parameters for a properly functioning street light circuit 74. The processor preferably performs a continuous power analysis for each street lighting circuit to ensure that optimal energy-use efficiency is maintained. If an anomaly is detected 75, the processor performs further diagnostic analysis. By analysis of the input values the processor can immediately determine if a ground fault 76 or short circuit 77 exists in the circuit. If a ground fault or short circuit is detected, the street light circuit is immediately disconnected from the power source and an alert is transmitted to the external processor 78. By continuous monitoring of the current level, the system of the present invention can detect "silent" short circuits, i.e. short circuits not sufficient to blow a street lighting pole fuse. These "silent" short circuits would not be detected by standard safety mechanisms.

The processor preferably continuously compares the current, voltage and power levels with known algorithms for the circuit to determine if there is a component failure 66, how many lamps are inoperable on the circuit 67, or if improper sized components have been installed 68. For example, the processor can determine if an improper sized resistor or fuse is being used in a circuit. The external processor is then alerted 69 with a specific diagnosis so that required repairs can be initiated. The system of the present invention therefore advantageously enables highly precise preventative maintenance. This is a significant improvement over existing systems where repairs are effected only when malfunctions become visibly apparent, as when a lamp malfunctions.

Figure 7:
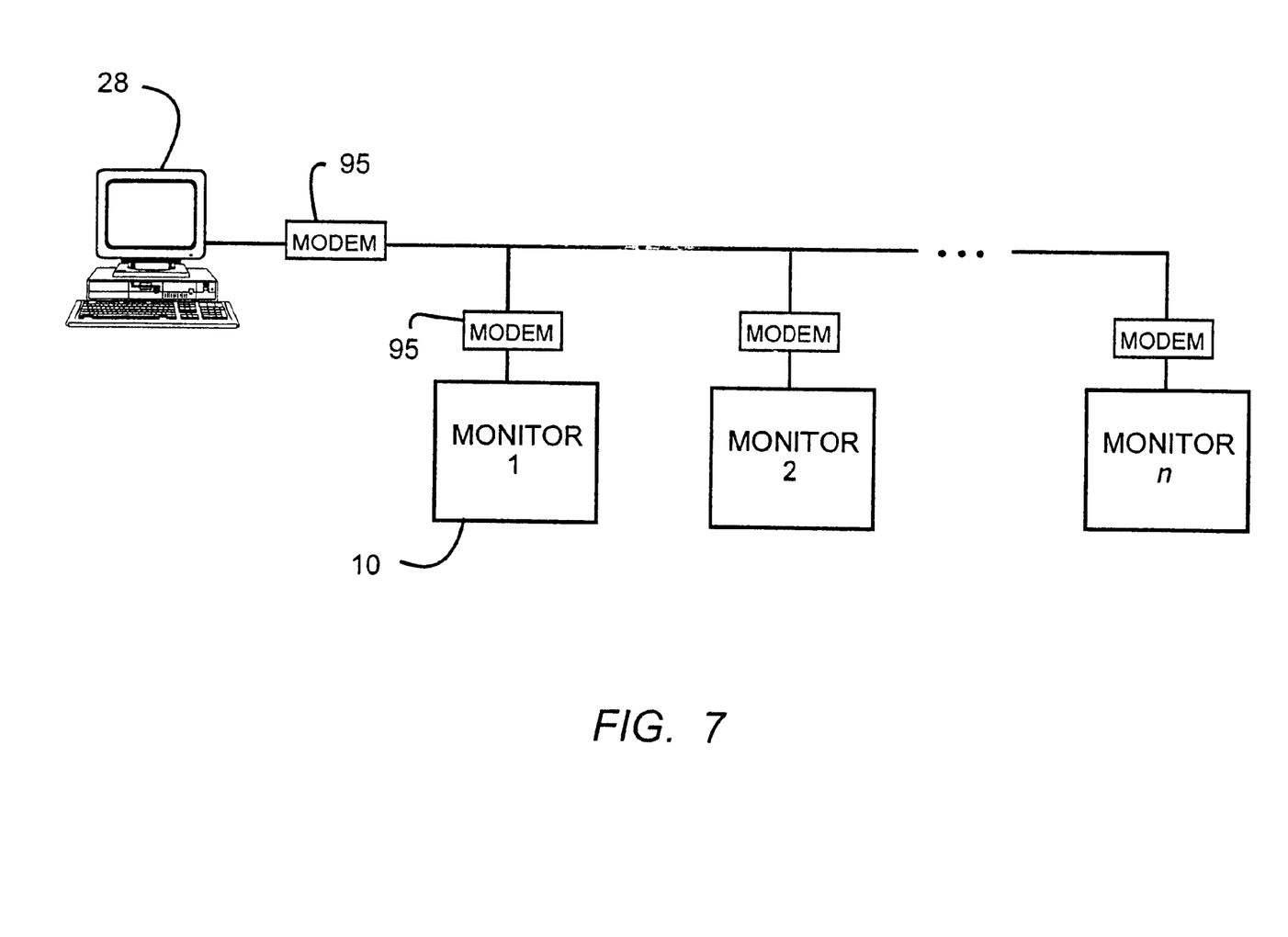
FIG. 7 illustrates a preferred configuration in which a plurality of monitoring devices are coupled to a single external processor via communication means.

As shown in FIG. 7, a plurality of monitoring devices 10 coupled to modems 95 can be in communication with a single external processor 28 via communication means 26. In this way, the external processor 28 functions as a central monitoring station for the street lighting circuits controlled by the plurality of monitoring devices 10. The external processor 28 can be a personal computer. The external processor 28 is preferably in communication with the responsible electric utility company so that a prompt dispatch of repair personnel can be immediately dispatched to the appropriate area if a power failure is detected by one of the monitoring devices 10. In cases where the street lighting in different jurisdictions is maintained by different electrical contractors, the external processor 28 can alert the appropriate contractor if a problem is detected. The external processor 28 preferably includes programming to allow any circuit in communication with the external processor 28 to be remotely connected or disconnected from the power source. In this way, operation of the street light circuits can be controlled from a central monitoring station.

Figure 8:
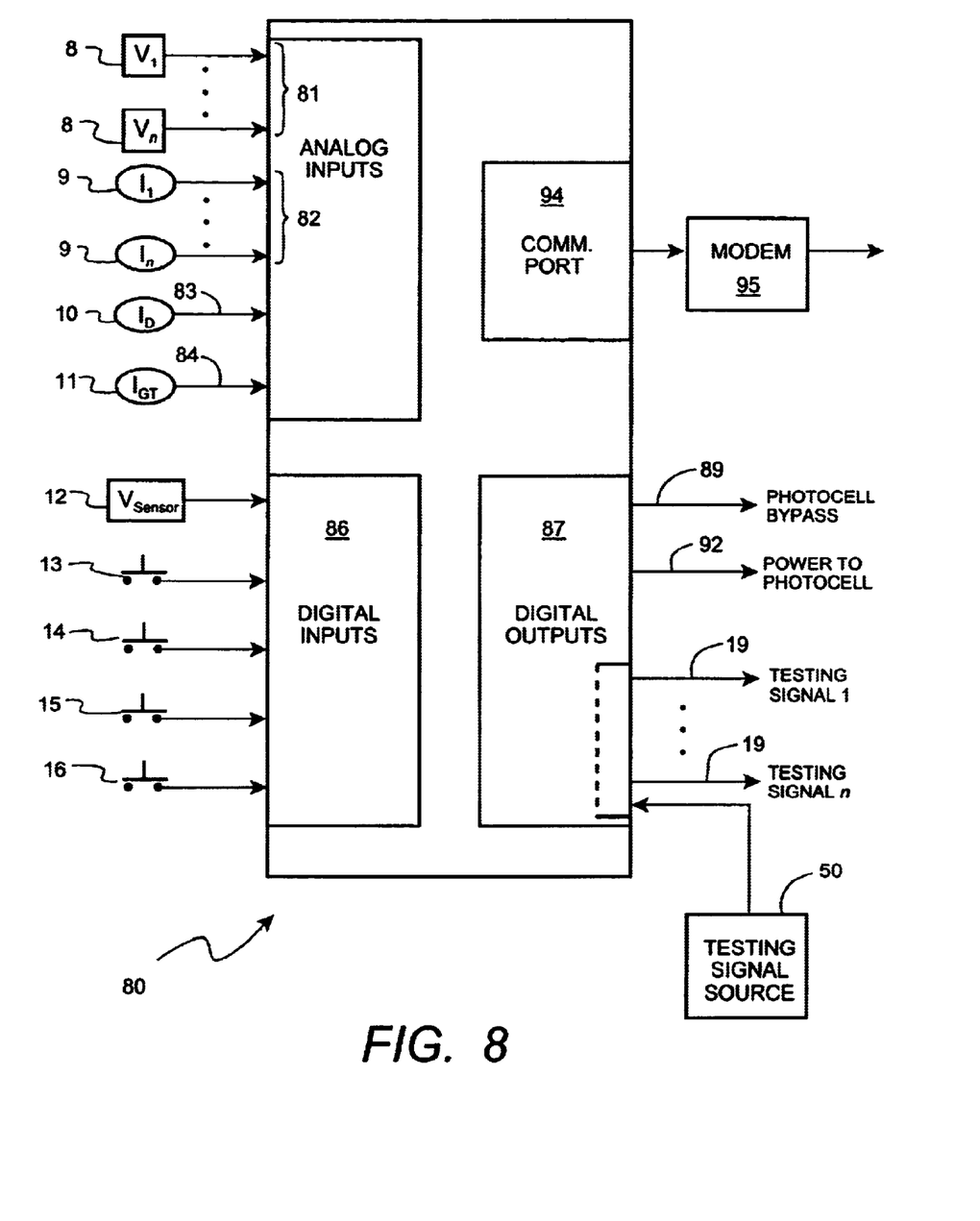
FIG. 8 illustrates a diagram of the configuration of a preferred micrologic controller in accordance with the invention.

The processor 20 can be any suitable programmable micrologic controller. A diagram of the configuration of a preferred micrologic controller 80 is shown in FIG. 8. The controller 80 preferably includes analog inputs 81 for receiving data for street lighting circuits 1–n. Input ports 81 receive the street lighting circuits voltages $V_{1-n}$, and input ports 82 receive street lighting circuits currents $I_{1-n}$. Input port 83 receives input from the out of balance current monitor for the street lighting circuits street lighting circuits voltages street lighting street lighting circuits 1–n. Input port 84 receives current data $I_{GT}$ from the ground test circuit as discussed above. A sensor which monitors the service panel switch voltage inputs data into input 85

The controller 80 also includes digital inputs 86 and digital outputs 87. In order to determine if photocell control of the street lamps is functioning correctly, the digital inputs 86 preferably include a switch 88 for manual bypass of photocell control, with corresponding digital output 89. The photocell operation can be manually reset by means of switch 91 and corresponding digital output 92. The ground test circuits 1–n as discussed above are preferably coupled to digital outputs 93 and testing signal source 50.

In the preferred embodiment, the controller 80 includes a communications port 94. The communications port can be coupled to a telephone modem 95 communication with the external processor.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

We claim:

1. A system for monitoring and providing a safety disconnect for a plurality of light circuits, comprising:
   a monitor device electrically coupled to a light circuit service panel, said monitor device comprising:
      a switching means complementary to an existing disconnect means operable to independently disconnect a light circuit from a power source;
      input means for collecting real-time data, said input means including:
         means for detecting unequal current levels in said plurality of light circuits;
         means for continuous surveillance of ground wire continuity for the light circuit; means for continuous sensing of the current level in a light circuit;
         means for continuous sensing of the voltage level in the light circuit; and
      a processor coupled to said input means, said processor operable to perform the steps of:
         analyzing said current level in each light circuit in real time by comparing the current level with known parameters;
         analyzing said voltage level in each circuit in real time by comparing the voltage level with known parameters;
         computing power usage in each circuit and analyzing said power usage by comparison with known parameters;
         determining if disconnect conditions exist in each circuit; and
         disconnecting the circuit from a power source if said disconnect conditions exist.

2. The system of claim 1, wherein said means for continuous surveillance of ground wire continuity comprises:
   a plurality of ground wire test circuits corresponding to each of said plurality of light circuits,
   a test signal generator, wherein said test signal generator is operable to transmit a known test signal through said plurality of ground wire test circuits; and
   means for continuous sensing of the current level from said known test signal in each of the plurality of ground wire test circuits.

3. The system of claim 2, wherein said processor is further operable to perform the steps of:
   analyzing said current level in each ground wire test circuit by comparing the current level with known parameters;
   determining if disconnect conditions exist for a light circuit;
   and disconnecting the light circuit from a power source if said disconnect conditions exist.

4. The system of claim 2, wherein said disconnect conditions comprise a decrease in said ground wire test circuit current level due to a discontinuity in the ground wire.

5. The system of claim 1, wherein means for continuous sensing of the current level is a current measuring transducer.

6. The system of claim 1, wherein means for continuous sensing of the voltage level is a voltage measuring transducer.

7. The system of claim 2, wherein means for continuous sensing of the current level is a current measuring transducer.

8. The system of claim 1, wherein said processor is further operable to perform the step of:
   determining the number of non-functional lamps on each circuiting by comparing said current level and said voltage level with known parameters.

9. The system of claim 1, wherein said processor is further operable to perform the steps of:
   detecting a short circuit in a light circuit by comparing said current level and said voltage level with known parameters; and
   disconnecting said light circuit if a short circuit exists.

10. The system of claim 1, wherein said processor is further operable to perform the steps of:
    detecting a ground fault in a light circuit by comparing said current level and said voltage level with known parameters; and
    disconnecting said light circuit if a ground fault exists.

11. The system of claim 1, further comprising:
    communication means coupled to said processor; and
    a remotely located external processor, wherein said processor of said monitor device is in communication with said external processor.

12. The system of claim 12, wherein said processor is further operable to perform the steps of:
    detecting a power failure in a plurality of light circuits by comparing said current level and said voltage level with known parameters; and
    transmitting an indication of said power failure via said communication means to said external processor.

13. The system of claim 12, further including the step of:
    transmitting an indication of said power failure via said communication means.

14. The system of claim 1, wherein said processor is further operable to perform the step of:
    determining if proper size components are installed in a light circuit by comparing said current level and said voltage level with known parameters.

15. The system of claim 1, wherein said processor is further operable to perform the step of:
    detecting non-functional components in a light circuit by comparing said current level and said voltage level with known parameters.

16. The system of claim 11, wherein said communications means is a modem coupled to a telephonic communication system.

17. The system of claim 11, wherein said communications means is a radio transceiver system.

18. The system of claim 11, wherein said communications means is a satellite communication system.

19. The system of claim 11, wherein said data is transmitted to said external processor via said communication means.

20. The system of claim 11, wherein said external processor is in communication with coupled to a plurality of said monitor devices via said communication means.

21. The system of claim 1, wherein each the plurality of light circuits are operable by a photocell, and the monitoring device further comprises means to bypass a photocell coupled to a light circuit to independently connect and disconnect each of the plurality of lights to and from a power source.

22. The system of claim 21, wherein said external processor is operable to perform the step of:

analyzing said current level in each light circuit in real time by comparing the current level with known parameters;

analyzing said voltage level in each light circuit in real time by comparing the voltage level with known parameters;

computing power usage in each light circuit and analyzing said power usage by comparison with known parameters;

determining if disconnect conditions exist in each circuit; and disconnecting the circuit from a power source if said disconnect conditions exist.

23. The system of claim 1, wherein said external processor is operable to perform the step of:

actuating said switching means of said monitoring device to connect and disconnect a light circuit to a power source.

* * * * *